May 27, 1952     H. F. SMITH     2,598,195
FLUSH TANK INLET VALVE
Filed July 5, 1947
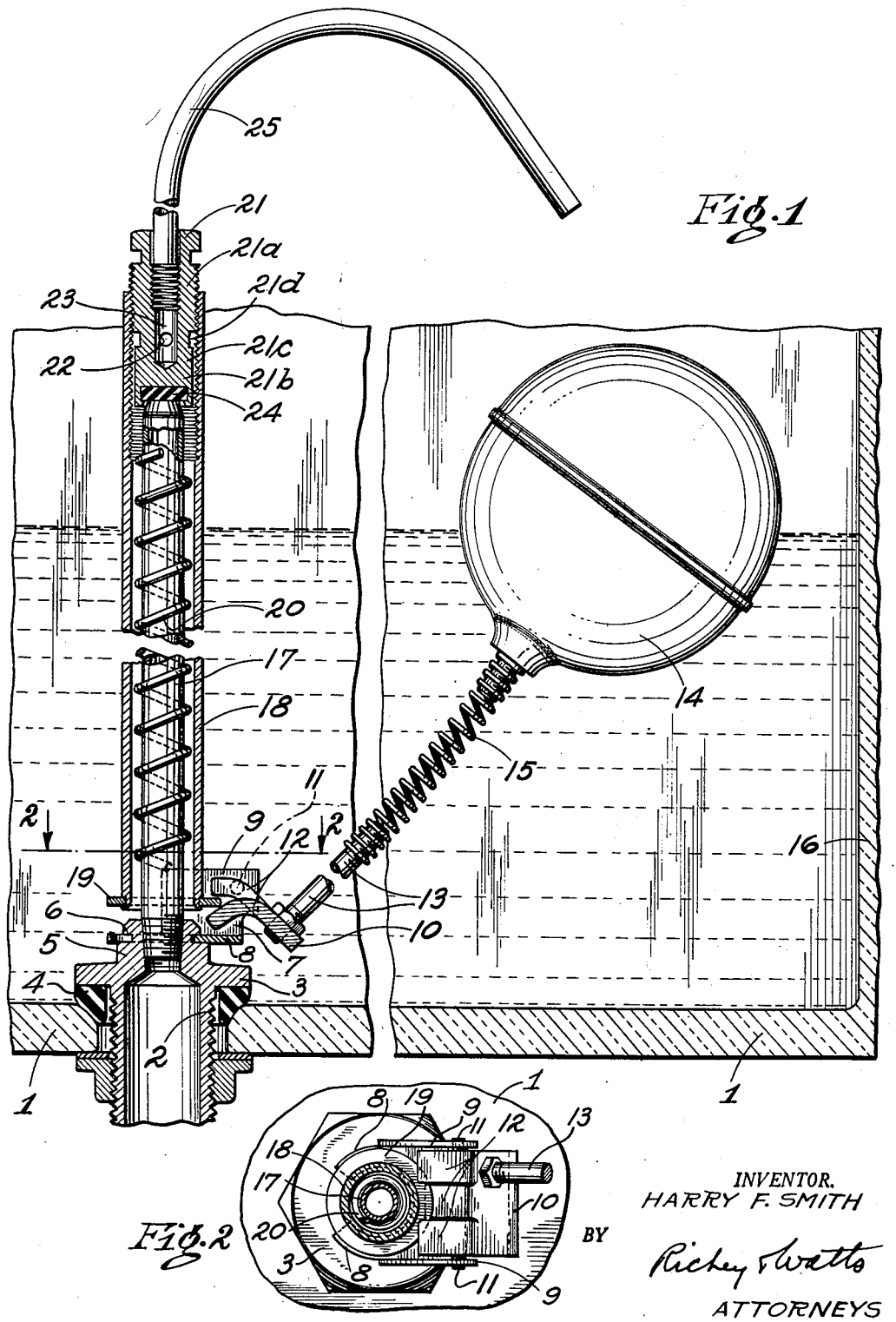
INVENTOR.
HARRY F. SMITH
BY
Richey & Watts
ATTORNEYS Patented May 27, 1952

2,598,195

UNITED STATES PATENT OFFICE 2,598,195

FLUSH TANK INLET VALVE

Harry F. Smith, Lexington, Ohio, assignor to Mansfield Sanitary Pottery Inc., Perrysville, Ohio, a corporation of Ohio Application July 5, 1947, Serial No. 759,064

8 Claims. (Cl. 137—104)

This invention relates generally to inlet apparatus for flush tanks and particularly to apparatus for reducing the pressure of water after it leaves the valve and before it is discharged into a flush tank and for decreasing the pressure required to close the inlet valve as it approaches the seat.

In many of the prior water inlet devices for flush tanks objectionable noise accompanies the flow of water into the tank. Often this noise is produced by water moving at high velocity but sometimes it results from slow closing of the inlet valve during the last part of the closing movement. Many efforts have been made heretofore to eliminate noise from both of these sources but, so far as I am aware, none of these efforts has been entirely satisfactory.

One type of inlet apparatus, the hush pipe type, may be fairly quiet in operation but when the hush pipe is actuated by means at its lower end, difficulty is often experienced in installing it in some of the older tanks. When the inlet valve actuating means is near the bottom of the tank the float arm must move thru a wide angle to permit full opening of the valve and also to position the float at the water level when the tank is filled to the depth required by the older type tank. When the float arm moves thru such a wide angle and the water level is at the normal height in the tank, the float is positioned near the middle of the tank where it is likely to interfere with other parts of the apparatus, such as the flush valve. Accordingly, it would be quite desirable to have float means which could be used in the old type of tanks with inlet valve actuating means near the bottom of the tank and which would not interfere with other parts of the apparatus when the tank contains water to the desired depth.

The present invention provides new and quite satisfactory apparatus for discharging water into a flush tank quietly, for accelerating the speed of movement of the valve during the last portion of its closing stroke, and for reducing the pressure resisting closing of the inlet valve in the last stages of the closing motion; and also provides new, simple and quite effective float apparatus for inlet valve actuating means near the bottom of a tank, even a deep tank.

Briefly described, the present invention contemplates the provision of an inlet pipe surrounded by a hush pipe and means in the hush pipe for reducing the pressure of water admitted thru the inlet valve. It also contemplates a refill pipe leading to the interior of the hush pipe and means for greatly reducing the pressure on the water between its entry into the hush pipe and its exit therefrom into the refill pipe. It also contemplates inlet valve actuating means disposed close to the bottom of the flush tank and means for accelerating the final part of the valve closing movement.

In the drawings accompanying and forming a part of this specification,

Fig. 1 is a side elevational view of my preferred embodiment of the present invention.

Fig. 2 is a view partly in section taken on line 2—2 of Fig. 1.

In the figures flush tank 1 has a hole in its bottom wall thru which an inlet pipe extends. This inlet pipe includes a threaded nipple 2 extending thru the bottom wall of the tank with a hexagonal flange 3 to press a gasket 4 against the surface of the tank and close the hole about the nipple. Above the flange 3 the nipple is provided with a small diameter extension 5 having an open upper end. A groove 6 extends around nipple 2 near its upper end. A bracket 7 has a notched horizontal portion 8 fitting into groove 6 for free rotation of the bracket around pipe extension 5 and upstanding parallel portions 9. After the notched portion 8 of bracket 7 is assembled in groove 6, the fingers defining the notch are preferably bent toward one another to extend around nipple 2 far enough to prevent dislodgement of the bracket from the groove. A lever 10 has integral pivots 11 which are rotatably mounted in holes in portions 9 of bracket 7 and has bifurcations 12 for a purpose presently to be described. A float arm 13 is screw threaded into the non-bifurcated end of lever 10. This arm 13, in certain installations, may have a float ball rigidly attached to the free end thereof in a conventional manner, but in other installations as illustrated in Fig. 1, the float 14 is preferably connected to the float arm by elastic means 15. This means, as illustrated, is a coil spring secured at its ends to the float ball and arm respectively and is readily bendable by engagement of the float with the end wall 16 of the tank, as well as by the lift of the float. The maximum extent to which the hush pipe may be moved upwardly is determined by the extent to which arm 13 projects thru lever 10 for the end of the arm strikes bracket 7 and thus limits the downward movement of the arm.

The inlet pipe 17 is threaded at its lower end into nipple 2 and is open at its top end. A hush pipe 18 surrounds inlet pipe 17 and extends from a point near the lower end of that pipe and within the bracket 7 to a point above the upper open end of pipe 17. At its lower end hush pipe 18 has secured thereto a rectangular foot 19 which has a sliding fit between the vertical parts 9 of bracket 7 and projects into the space between the bifurcations 12 of lever 10. It will be understood that when lever 10 pivots about pivots 11 the hush pipe will be moved endwise by reason of the engagement of lever 10 with the rectangular foot 19.

A coil spring 20 surrounds inlet pipe 17 for substantially its full length and grips the outer surface of that pipe so that it is not dislodged by the force of water flowing past it. The outside diameter of coil 20 is slightly smaller than the inside diameter of hush pipe 18.

The upper end of hush pipe 18 is interiorly threaded and a plug 21 is screw threaded therein. This plug comprises an upper part 21a which is exteriorly threaded to make screw threaded engagement with the hush pipe, a lower portion 21b which has a smooth cylindrical outer surface of slightly smaller diameter than the opposed threaded inner surface of the hush pipe, and a mid-portion 21c provided with an external annular groove 21d. An opening 22 extends radially from the bottom of groove 21d into a longitudinally extending passage 23 which is open at the upper end of the plug. In its lower face plug 21 carries a gasket 24 which is positioned to seat on, and is capable of sealing the open top end of, inlet pipe 17. A refill tube 25 extends into passage 23 and has screw threaded engagement therein.

The operation of the illustrated apparatus is substantially as follows: When the flush valve is opened and the water level falls in the tank, the pressure of water in inlet pipe 17 tends to lift gasket 24 off the end of pipe 4 and thus move hush pipe 18 up endwise. The force of gravity pulls the float ball and arm downwardly as the water level falls and thus the arm 13 is pivoted with resultant upward endwise movement of hush pipe 18. Thus the weight of the float acting thru the lower lip of bifurcation 12 and the pressure of water in pipe 17 combine to open the inlet valve. When the float ball is elastically coupled to the float arm and the float engages with the end wall of the tank during the downward movement of the float arm, the spring 13 may bend and permit continued downward movement of the arm with but slight frictional resistance despite the fact that the float may be engaging the end wall of the tank.

When the gasket 24 is moved away from the end of inlet pipe 12, water at considerable pressure enters the hush pipe 18. This water may flow both downwardly and upwardly. The water which moves downwardly may be thought of as flowing in two differently shaped streams. One stream is spiral in shape and is defined on three slides by the outer surface of the inlet pipe and by adjacent turns of the spring 20. The other stream is in the form of a straight annulus defined on the outer side by the inner surface of the hush pipe. These two streams are in contact with each other at their opposed surfaces. When the sizes of these two streams are properly proportioned a pronounced velocity-retarding effect is obtained due to the shearing action of one stream on the other and the turbulence caused by the contact of the two streams and the interference of each one on the flow of the other. When the dimensions of the streams or their passages are properly proportioned the velocity of the water flowing from the lower end of the hush pipe may be so low as to produce little or no noise.

While the sizes of these passages may vary considerably, good results have been obtained when the area of the spiral passage was about 0.23 sq. in. (a depth of $\frac{1}{16}$" which was the diameter of the wire of the coil and a width of $\frac{3}{8}$" which was the distance between adjacent turns of the coil), and the area of the straight passage was about .020 sq. in. (a width of .0125" which was the radial distance from the inner surface of the hush pipe to the outer surface of the coil and the circumferential length of that inner surface which was 1.61"). The total area of these two water passages amounted to .043", of which 54% was represented by the spiral passage and 46% by the straight passage. It will be understood that altho the inside diameter of the hush pipe is about .0125" greater than the outside diameter of the coil in the foregoing illustration this distance may be varied within limits determined by the roughness of the tubing surfaces, the pitch of the guide spring, and the pressure of the water supply, as is well understood by those skilled in the art.

Altho spring 20 is shown as cylindrical, it will be understood that it may be given other shapes. For example, the spring might be coiled about a hexagonal form which would give it a hexagonal-like shape and when the spring so wound is assembled on a cylindrical inlet pipe it would contact with the pipe at six spaced points for each convolution and would be spaced apart from the pipe between those points and would thereby provide spaces thru which water could pass between the spring and the tube. The six spaced points in the circumference of the wire would also serve as efficient guides for the hush pipe. It will be understood that the spring might be formed around various other shapes, like a square, rectangle, triangle and the like.

When water flows upwardly past the lower part 21b of the plug 21 and into passage 23 and thence into refill tube 25, its velocity will be greatly reduced in substantially the same manner as the velocity of the downwardly flowing water is reduced and as has just been described. This results from the fact that part of the water flows in a spiral stream in the threads of the hush pipe while the remainder flows in a straight annular stream along the opposed smooth surface of the plug part 21b. These two streams interfere with each other in the same way and produce the same type of turbulence and the same general loss of velocity as has been described above in connection with the downwardly flowing streams altho the relative position of straight and spiral streams is reversed.

It will be understood that since it is the intersection of the straight and spiral streams of water that causes velocity reduction, the amount of reduction or the pressure to which the water pressure is to be reduced, may be regulated by regulating the length of the spring 20. In general, greater reductions of pressure are obtained with longer lengths of spring and smaller amounts of reduction are obtained with shorter lengths of spring. If desired, the upper end of the coil spring may be fixedly secured to the inlet pipe. However, if its upper end is not fixed in place and if it is secured at its lower end to the inlet pipe, or if it is allowed to rest on an abutment at its lower end, it may serve as an automatic adjuster to reduce variable water pressure to the same final pressure. Thus, when the lower end of this spring is maintained in fixed position, increases in water pressure will tend to compress the spring axially, thus closing the width of the spiral passage and reducing the flow area. When the water velocity decreases, the spring may expand upwardly and increase the width of the spiral passages and thereby increase the flow area and permit a corresponding increase in velocity.

The acceleration of the speed of closing of the inlet valve in the last portion of its closing stroke is traceable in large part to the change in effective water pressure and the varying area on which this pressure acts as the valve is closing. When the gasket 24 is some distance away from the upper end of inlet pipe 17, the full water pressure acts on the entire internal sectional area of the hush pipe which, in one particular instance, was .22 sq. in., there being substantially no pressure drop across the valve proper. When the gasket 24 is seated on the inlet pipe, the area exposed to the full water pressure is only the area of the inside of the inlet pipe which, in the same instance, was about .06 sq. in. Thus, during the closing of the valve the effective water pressure area varied from .22 sq. in. to .06 sq. in. Thus the vertical lift on the hush pipe when the valve was closed was only about one-third of the lift when the valve was open. Since upward movement of the float arm is the only means present for closing the valve and since that upward movement is opposed by the effective water pressure in the hush pipe, it will be understood that the float may be submerged to a considerable extent before the force tending to move it upwardly exceeds the water pressure opposing such movement. The first part of the valve closing stroke of the hush pipe will be at a rather slow speed for it will be determined by the rate of rise of water level in the tank. When the gasket approaches closely to its seat on the inlet pipe the effective pressure area is decreased substantially to that on the interior cross-sectional area of the inlet pipe. This sudden decrease in resistance to closing movement of the hush pipe permits the float to move upwardly suddenly in the water and thereby accelerate the rate of valve closing movement of the hush pipe. This motion is considerably increased when elastic means connects the float and its arm for the lateral motion of the float due to straightening of the elastic connection speeds the movement of the float arm in addition to that caused by upward movement of the float. The resultant quick closing of the valve results in avoidance of the hissing noise so common with some flush tanks.

Subject matter shown but not claimed in this application is being claimed in one or another of the following applications: Serial No. 61,646, filed November 23, 1948; Serial No. 107,072, filed July 27, 1949; and Serial No. 107,073, filed July 27, 1949.

Having thus described my invention so that others skilled in the art may be able to understand and practice the same, I state that what I desire to secure by Letters Patent is defined in what is claimed.

What is claimed is:

1. In a flush tank including an inlet pipe, the combination of a hush pipe surrounding the inlet pipe and extending downwardly from the upper end of said inlet pipe, said hush pipe having internal threads near its upper end, a plug adjustable in the hush pipe, having an upper portion engaging said threads, a lower portion having a smooth cylindrical surface disposed close to but out of contact with said threads, and a groove on its exterior between said portions, a gasket in the lower face of said plug to seat on and seal the upper end of said inlet pipe, a refill pipe in said plug and communicating with the interior of said hush pipe through said groove, and means to move the hush pipe endwise to open and close said inlet pipe.

2. In a flush tank including an inlet pipe, the combination of a hush pipe surrounding the inlet pipe and extending down from above the upper end of the inlet pipe, a wire spring surrounding and gripping the outer surface of said inlet pipe, the outside diameter of the spring being slightly less than the inside diameter of said hush pipe, a plug adjustable in the hush pipe, having an upper threaded portion engaged with the threads on the hush pipe, a lower portion whose outer cylindrical surface is close to, but out of contact with, threads of the hush pipe, and an intermediate portion having an annular groove, an opening extending radially from the bottom of said groove to a passage open at the top of said plug, a refill pipe extending from said passage and communicating with the interior of the hush pipe through said passage and groove, a gasket in the lower face of the plug to seal the upper end of the inlet pipe, and means for actuating said hush pipe endwise to open and close said inlet.

3. In a flush tank having an inlet pipe and a hush pipe surrounding and extending down over said inlet pipe, the combination of a wire spring surrounding and gripping the outer surface of said inlet pipe, the outer surface of the spring being close to, but out of contact with, the inner surface of said hush pipe, the upper end of said hush pipe being interiorly threaded, a plug screw-threaded in the upper end of said hush pipe, said plug having a lower portion whose outer cylindrical surface is close to, but out of contact with, said threads on the hush pipe, said plug having an annular groove around its mid-portion between the threaded and unthreaded parts thereof and also having an opening extending radially from the bottom of said groove to the central part thereof and then axially to the upper end thereof, a refill pipe threaded in said axial passage, a gasket carried in the lower face of said plug to seat on and seal the upper end of said inlet pipe against flow of water therethru, means to raise and lower said hush pipe comprising a bracket freely rotatable in a groove around said inlet pipe below the hush pipe, a foot secured at the lower end of the hush pipe, a rack pivoted to said bracket and engageable with the upper and lower sides of said foot, a float arm connected to said rack, a float engageable with the said end wall of the tank, and elastic means connecting said float to said float arm.

4. In a flush tank having an end wall, an inlet pipe and a hush pipe surrounding and extending down over said inlet pipe, the combination of means in said hush pipe to close the open top end of said inlet pipe, of means to raise and lower said hush pipe comprising a foot at the lower end of the hush pipe, a bracket freely rotatable in a groove around said inlet pipe below the hush pipe, a lever pivoted to said bracket and engageable with the upper and lower sides of said foot, a float arm connected to said lever, a float engageable with the said end wall of the tank, and elastic means connecting said float to said float arm.

5. In a flush tank including an inlet pipe and a hush pipe surrounding and extending down over said inlet pipe, the combination of means for controlling the pressure drop of water in the hush pipe, said means including a wire spring surrounding and engaging the outer surface of said inlet pipe and having an outside diameter slightly less than the inside diameter of said hush pipe, said spring being supported at its lower end and being compressible under the force of water exerted downwardly thereon from above its upper end.

6. In a flush tank including an inlet pipe and a hush pipe surrounding and extending downwardly over the inlet pipe, the combination of means for controlling the pressure drop of water between the hush pipe and the inlet pipe, said means including a wire spring surrounding and pressing against the outer surface of said inlet pipe and having an outside diameter slightly less than the inside diameter of the hush pipe.

7. In a flush tank having an inlet pipe and a hush pipe surrounding and extending downwardly over said inlet pipe, the combination of means to move said hush pipe endwise, said means including a pivoted float arm operatively associated with the lower end of said hush pipe to move said pipe endwise, a float engageable with a vertical wall of the tank and elastic means connecting said arm and float.

8. In a flush tank including an inlet pipe and a hush pipe surrounding and extending downwardly over said inlet pipe, the combination of means to move said hush pipe endwise, said means including a pivoted float arm operatively associated with the lower end of the hush pipe to move said pipe endwise, a float movable on an end wall of said tank and elastic means connecting said ball to said float arm.

HARRY F. SMITH.

REFERENCES CITED

The following references are of record in the file of this patent:

UNITED STATES PATENTS

| Number | Name | Date |
| --- | --- | --- |
| 588,765 | Draullette | Aug. 24, 1897 |
| 1,015,053 | Mayer | Jan. 16, 1912 |
| 1,099,800 | Helgerson | June 9, 1914 |
| 1,368,884 | Bozeman | Feb. 15, 1921 |
| 1,377,669 | Cowell | May 10, 1921 |
| 1,497,796 | Sherwood | June 17, 1924 |
| 1,625,589 | Bletcher | Apr. 19, 1927 |
| 1,649,620 | Siefen | Nov. 15, 1927 |
| 1,833,518 | Ericson | Nov. 24, 1931 |
| 1,839,042 | McPartland | Dec. 29, 1931 |
| 2,367,951 | Lewis | Jan. 23, 1945 |